United States Patent
Bouvet

(10) Patent No.: US 11,082,556 B2
(45) Date of Patent: Aug. 3, 2021

(54) SYSTEM AND METHOD FOR DETERMINING SPOOFING OF AT LEAST ONE IDENTIFIER

(71) Applicant: Orange, Paris (FR)

(72) Inventor: Bertrand Bouvet, Chatillon (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 16/905,757

(22) Filed: Jun. 18, 2020

(65) Prior Publication Data

US 2020/0404098 A1 Dec. 24, 2020

(30) Foreign Application Priority Data

Jun. 21, 2019 (FR) ........................ 1906721

(51) Int. Cl.
| | |
|---|---|
| *H04M 3/42* | (2006.01) |
| *H04M 3/436* | (2006.01) |
| *H04M 3/38* | (2006.01) |
| *H04M 7/00* | (2006.01) |

(52) U.S. Cl.
CPC ........... *H04M 3/436* (2013.01); *H04M 3/382* (2013.01); *H04M 3/42059* (2013.01); *H04M 7/0069* (2013.01)

(58) Field of Classification Search
CPC .................................................. H04M 3/436
USPC ........... 379/201.01, 201.07, 207.02, 221.01, 379/220.01, 114.14, 142.01
See application file for complete search history.

(56) References Cited

U.S. PATENT DOCUMENTS

| | | | |
|---|---|---|---|
| 2003/0154400 A1* | 8/2003 | Pirttimaa | H04L 63/126 726/14 |
| 2009/0067410 A1* | 3/2009 | Sterman | H04L 63/14 370/352 |
| 2013/0152153 A1* | 6/2013 | Weiser | H04L 65/1006 726/1 |
| 2013/0156153 A1* | 6/2013 | Koh | H01L 27/14658 378/37 |
| 2015/0229609 A1* | 8/2015 | Chien | G06F 21/6218 726/13 |
| 2016/0366276 A1 | 12/2016 | Bouvet et al. | |

* cited by examiner

OTHER PUBLICATIONS

French Search Report and Written Opinion dated Nov. 12, 2019 for French Application No. 1906721.

*Primary Examiner* — William J Deane, Jr.
(74) *Attorney, Agent, or Firm* — Knobbe, Martens, Olson & Bear, LLP

(57) ABSTRACT

A system and method for determining spoofing of at least one identifier are described, the identifier being intended for the use of a communication device, during communication between a first communication terminal and a second communication terminal. The method can be implemented by a device for determining spoofing of at least one identifier. The method can include receiving a signaling message of the communication from the first communication terminal and intended for the second communication terminal, the signaling message including at least one identifier and at least one first item of certification data, obtaining at least one second item of certification data on the basis of the at least one received identifier, comparing the at least one first item of certification data with said at least one second item of certification data, and transmitting at least the message to the second terminal on the basis of the result of the comparison.

17 Claims, 2 Drawing Sheets

SYSTEM AND METHOD FOR DETERMINING SPOOFING OF AT LEAST ONE IDENTIFIER

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims priority to French Patent Application No. 1906721, filed Jun. 21, 2019 and entitled METHOD FOR DETERMINING SPOOFING OF AT LEAST ONE IDENTIFIER, the disclosure of which is hereby incorporated by reference in its entirety.

BACKGROUND

Technological Field

The disclosed technology relates to the field of telecommunications and more particularly to a method for filtering unsolicited electronic communications such as telephone calls.

Description of the Related Technology

Users of telecommunications services (telephony, videophony, SMS, RCS, instant messaging, email, etc.) are increasingly receiving unsolicited electronic communications with numerous accompanying inconveniences (busy line, wasted time, disruptions, etc.). This is the case for example with telemarketing campaigns. In response, an increasing number of users are disconnecting/switching off the mobile terminal or terminals so as not to be bothered by these unwanted calls. All this leads to a decrease in the volume of calls, resulting in a drop in the sales revenue of telecommunications operators.

These unwanted calls more often than not originate from call centers or calling robots located abroad. It is therefore very difficult to regulate this activity and to impose good practice.

In France, the French government has set up the "Bloctel" system (registered trademark of the French state) allowing users of fixed and mobile telephony services to declare, on the "Bloctel" website (http://www.bloctel.gouv.fr/ dated 20 May 2019) or by calling a dedicated telephone number, the telephone number or numbers for which the user does not wish to receive sales calls, calls from call centers or calling robots, who in theory have to consult this database to find out whether or not they are authorized to canvass for sales leads, but few do so in practice. In order to use the service, the user has to fill in a subscription form and provide an email address. Said user then has to validate this subscription by clicking on the (URL) link that has been sent to him by the Bloctel platform in an email. Once the subscription has been performed, the user will have the option of accessing his personal space and of filing any claims there. It should be noted that the service is not immediately operational and that there is an activation period that may last up to 30 days.

Telecommunications operators have also responded by offering their clients services for filtering unsolicited electronic communications. One French telecommunications operator proposes for example to declare, via a configuration interface of their Internet gateway (box), the numbers, prefixes or number intervals for which the clients do not wish to receive any calls. Although this solution is simple and inexpensive in terms of implementation, it is, however, not optimum since the incoming call is routed to the box of the called party before it is potentially declined if the calling number is present in the list of the numbers to be rejected.

Another French telecommunications operator also proposes a service for filtering unsolicited electronic communications, but for its part uses a service platform located in the network that, under certain conditions, asks the caller to identify himself vocally before presenting the call to the called party with the recorded voice identification message. The conditions for requesting voice identification from the caller are for example a masked calling number (anonymous call), an unavailable calling number, for example when the call transits via networks having incomplete signaling, when some of the information present at the start of the call is lost while the call is established, or else if the identity of the caller is certified as not being compliant with the numbering plan defined by the regulatory authority. Such a method does not allow automatic call processing. Specifically, the called party has to consult the voice identification message from the caller before accepting or not accepting the call. This also involves a longer delay for being put through, with the risk of the caller hanging up before the called party has had time to consult the voice message. The service also allows its clients to configure a list of 20 numbers (blacklist) via a web portal. If the calling number is present in this list, then it is not routed to the called party. A voice message indicating rejection of the call by the called party is then rendered to the caller.

Since these services are mostly based on a declarative list (blacklist) of the numbers to be filtered, their effectiveness is therefore not optimum, since call centers regularly change calling number. This results in a constantly evolving blacklist that is never up-to-date, and incoming calls that are always difficult to filter/decline.

From a technical viewpoint, call centers or calling robots have the possibility of changing their call numbers very easily by virtue in particular of end-to-end digital networks. Specifically, unlike PSTN (public-switched telephone network) technology, which does not make it possible to present a number other than the one assigned to the physical telephone line of the caller to the called party, the technologies used by digital networks provide the option of inserting new calling identities, such as virtual numbers, in the ISUP (ISDN Signaling User Part) signaling protocol, and more particularly in the "Generic Number" information field. The virtual number is thus transmitted transparently as far as the terminal of the called party, without undergoing any check whatsoever by the network. Since the terminal of the called party is able to display just one calling number, it is the virtual number declared in the "Generic Number" information field that is displayed on the telephone of the called party in order to allow him to directly call back his correspondent, without having to pass for example via the switchboard of a company whose number generally corresponds to the number of the physical telephone line. This logic is also complied with by VoIP (Voice over IP) telephony services that use for example the SIP (Session Initiation Protocol) protocol. The number associated with the physical telephone line is conveyed in the field of a SIP PAI (Private-Asserted-Id) header, whereas the number associated with the virtual line is conveyed in the SIP FROM header. If the called terminal is a SIP terminal, it is always the identity conveyed in the SIP FROM header that is displayed.

It has thus become very easy for malicious individuals to impersonate a third party by declaring the number of said third party in the SIP FROM header. This is the case for example of some malicious call centers or calling robots who will use a telephone number "close" to the number of the called party (for example using the same prefix) to give the called party slightly more confidence. The person whose number has been used fraudulently as calling number is then confronted with serious inconveniences, such as numerous calls from people who have been disturbed by the call center or calling robots, and even complaints. It should also be noted that some telecommunications operators provide their residential and business clients with services for changing the calling number presented to the called party.

Since telecommunications networks are evolving naturally toward an offer based on VoIP (Voice over IP) technology, with the significant deployment of VoLTE/VoWiFi (Voice over LTE/Voice over Wi-Fi) on 4G and before long 5G mobile networks, this problem risks increasing over time. This same observation may also apply to services using SMSoIP (Short Message Service over Internet Protocol) and IM (Instant Messaging) technologies such as RCS (Rich Communication Suite), or even automatic or semi-automatic software agents (robots or bots) in A2P (Application To Person) mode.

SUMMARY

The disclosed technology proposes a method for determining, for any type of electronic communication service through a communication network (telephony, videophony, RCS, instant messaging etc.) and any type of identifier, whether the identifier transmitted by a calling terminal to a called terminal has not been spoofed.

To this end, it proposes a method for determining spoofing of at least one identifier, said identifier being intended for the use of a communication means, during communication between a first and at least one second terminal, said method being implemented by a device for determining spoofing of at least one identifier, and characterized in that the method comprises:
  a step of receiving a signaling message of the communication from said first terminal and intended for said at least one second terminal, comprising said at least one identifier and at least one first item of certification data,
  a step of obtaining at least one second item of certification data on the basis of said at least one received identifier,
  a step of comparing said at least one first item of certification data with said at least one second item of certification data,
  a step of transmitting at least said message to said at least one second terminal on the basis of the result of the comparison.

Advantageously, according to embodiments described herein, the called user will be certain that the identifier rendered on his terminal, by virtue for example of a voice or a display, will actually be that of the caller. The called user may then decide, for example in the case of a telephone call, whether or not to take the call. Embodiments of the disclosed technology are also distinguished from alternatives in that the processing of the identifiers is able to be automated and does not require any intervention from the user. The method may for example be located on a server of an operator taking part in the communication, and the certification data may be provided by the various operators. The method furthermore offers the advantage of using the content of pre-existing information fields from the signaling protocol as certified data. No evolution in the call signaling and the associated equipments is thus necessary. The method also makes it possible to address all of the terminals of the called party that are engaged in the communication. Specifically, the called party may wish to receive calls on several terminals at the same time.

As used herein, the term "operator" is understood to mean all of the stakeholders for routing a communication from a calling user to a called user.

As used herein, the term "identifier" is understood to mean a string of characters used to identify an object, such as for example a telephone, or a user in a communication. The identifier may be for example an email address, an IP address, a telephone number or else a number of an identity document.

As used herein, the term "spoofing an identifier" is understood to mean that a first user has unduly appropriated the identifier of another user, thus allowing him to impersonate this other user in a communication.

According to one particular embodiment, a method such as described above is characterized in that the transmission step furthermore comprises transmitting an error message to said first terminal.

This embodiment makes it possible for example to notify the caller when the method considers that the identifier used in the communication has been spoofed. This mode of implementation also makes it possible to notify the caller when the obtainment step has not made it possible to recover the certification data associated with the identifier used in the communication. The notification may for example be rendered to the caller in the form of an audio message, a video message, a text message or vibrations.

According to one particular embodiment, a method such as described above is characterized in that the transmission step furthermore comprises transmitting an error message to said at least one second terminal.

This mode of implementation makes it possible for example to notify the called party when the obtainment step has not made it possible to recover the certification data associated with the identifier used in the communication. The called party will then be notified that the current communication has not been or is no longer certified. The notification may for example be rendered to the called party in the form of an audio message, a video message, a text message or vibrations.

According to one particular embodiment, a method such as described above is characterized in that said identifier corresponds to a telephone number of said first terminal.

This embodiment allows the recipient of a telephone communication to be certain that the telephone number rendered on his terminal, for example telephony or videophony terminal, is actually that of the caller.

According to one particular embodiment, a method such as described above is characterized in that said identifier corresponds to an email address used by said first terminal.

This embodiment allows the recipient of a communication to be certain that the email address rendered on his terminal, such as for example a computer or a tablet, is actually that of the caller.

According to one particular embodiment, a method such as described above is characterized in that said second item of certification data is obtained from a database. In this way, since the database is able to be updated regularly, the certification data used by the method to determine spoofing of an identifier are able to be modified until the method is executed. This thus makes it possible to have up-to-date certification data and a comparison result that is as relevant as possible. It should be noted that the database may be of any type and may or may not be hosted on the device.

According to one variant of this particular embodiment, the method such as described above is characterized in that said second item of certification data is transmitted to said database via a dedicated interface. This embodiment allows for example those holding rights to an identifier or their representatives to fill in the database with the certification data. In the case of a telephone number, this may be the operator on behalf of a client or the client himself. In this way, the certification data for the comparison are considered to be authentic and certified. It should be noted that the dedicated interface for transmitting the certification data to the database may be located on the same machine/server as the database or on a remote machine.

According to one particular embodiment, a method such as described above is characterized in that the reception of a signaling message requesting to establish the communication triggers the step of obtaining said at least one second item of certification data. This embodiment allows the user to be certain that the communication is certified as soon as it is established and that the identifier rendered on his terminal is actually that of the caller.

According to one particular embodiment, a method such as described above is characterized in that the reception of each signaling message of the communication triggers the step of obtaining said at least one second item of certification data. This embodiment makes it possible to ensure that the communication remains certified in its entirety. The user is thus certain that it is impossible to manipulate the identity of the caller during said communication.

According to one variant of this particular embodiment, the method such as described above is characterized in that the reception of each signaling message of the communication for sending multimedia content to said second terminal triggers the step of obtaining said at least one second item of certification data. This embodiment makes it possible to ensure that the content sent in a communication is actually sent by the caller and not by a third party. By virtue of this implementation, the transmission of the content is then certified as originating from the caller.

According to one particular embodiment, a method such as described above is characterized in that the result of the comparison of said identifier with said at least one first item of certification data triggers the step of obtaining said at least one second item of certification data. This embodiment makes it possible to reduce the number of requests to the digital storage space, such as a database, and therefore the loading thereof.

The disclosed technology also relates to a device for determining spoofing of at least one identifier, said identifier being intended for the use of a communication means, during communication on said communication means between a first and at least one second terminal, and characterized in that the device comprises:
- a communication module for receiving and/or transmitting a signaling message of the communication from said first terminal and intended for said at least one second terminal, said message comprising said at least one identifier and at least one first item of certification data,
- an obtainment module for obtaining at least one second item of certification data associated with said identifier,
- a comparison module for comparing said at least one first item of certification data with said at least one second item of certification data, such that the establishment of a positive result by the comparison module triggers the transmission of said signaling message by the communication module.

The term module may correspond equally to a software component or to a hardware component or to a set of software and hardware components, a software component itself corresponding to one or more computer programs or subroutines or, more generally, to any element of a program able to implement a function or a set of functions such as described for the modules in question. In the same way, a hardware component corresponds to any element of a hardware assembly able to implement a function or a set of functions for the module in question (integrated circuit, chip card, memory card, etc.).

The disclosed technology also relates to a system for determining spoofing of at least one identifier, said identifier being intended for the use of a communication means, during communication on said communication means between a first and at least one second terminal, and characterized in that the system comprises:
- a communication device comprising means for receiving and/or transmitting a signaling message of the communication from said first terminal and intended for said at least one second terminal, said message comprising said at least one identifier and at least one first item of certification data,
- an obtainment device comprising means for obtaining at least one second item of certification data associated with said identifier,
- a comparison device comprising means for comparing said at least one first item of certification data with said at least one second item of certification data,
- a storage device comprising means for storing said at least one identifier and said at least one second item of certification data associated with said at least one identifier, the devices being designed such that the establishment of a positive result by the comparison device triggers the transmission of said signaling message by the communication device.

According to one variant of this particular embodiment, the system as described above is characterized in that it furthermore comprises means for filling in at least one second item of certification data in said storage device via a human-machine interface. This embodiment allows the telecommunications operator who assigned an identifier to a client or the client himself for example to fill in the certification data associated with this identifier, but also to add/modify/delete a validity period linked to the filled-in certification data.

The disclosed technology also relates to a server or a gateway or a terminal, characterized in that it comprises a device for determining spoofing of at least one identifier such as described above.

The disclosed technology also relates to a computer program comprising instructions for implementing the above method according to any one of the particular embodiments described above when said program is executed by a processor. The method may be implemented in various ways, in particular in hard-wired form or in the form of software. This program may use any programming language and be in the form of source code, object code or intermediate code between source code and object code, such as in a partially compiled form, or in any other desirable form.

The disclosed technology also targets a computer-readable recording medium or information medium containing computer program instructions, such as mentioned above.

The above-mentioned recording media may be any entity or device capable of storing the program. For example, the medium may comprise a storage means, such as a ROM, for example a CD-ROM or a microelectronic circuit ROM, or else a magnetic recording means, for example a hard disk. Moreover, the recording media may correspond to a transmissible medium such as an electrical or optical signal, which may be routed via an electrical or optical cable, by radio or by other means. The programs according to the disclosed technology may in particular be downloaded from an Internet network.

As an alternative, the recording media may correspond to an integrated circuit in which the program is incorporated, the circuit being designed to execute or to be used in the execution of the method in question.

This device for determining spoofing of at least one identifier and this computer program have features and advantages that are analogous to those described above in relation to the method for determining spoofing of at least one identifier.

BRIEF DESCRIPTION OF THE DRAWINGS

Other features and advantages of the disclosed technology will become more clearly apparent upon reading the following description of particular embodiments, provided by way of simple illustrative and non-limiting example, and the appended drawings, in which.

DETAILED DESCRIPTION

Figure 1:
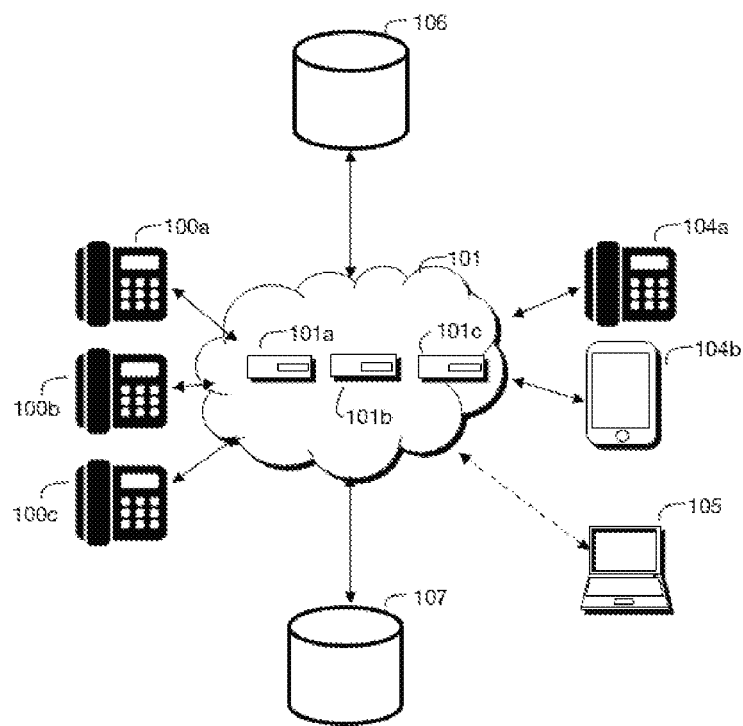
FIG. 1 illustrates an example of an implementation environment according to one particular embodiment.

FIG. 1 illustrates an example of an implementation environment of a particular embodiment of the disclosed technology. The environment shown in FIG. 1 comprises a communication network 101 to which terminals 100a, 100b, 100c, 104a and 104b are connected. The communication network 101 may be a mobile communications network with a GSM, EDGE, 3G, 3G+, 4G, 5G, Wi-Fi, etc. access network or a fixed communication network with an ADSL, Fiber, VDSL, Wi-Fi, etc. access network. It may implement an RCS architecture. The communication network 101 may also be an IP communication network implemented by an IMS (IP Multimedia Subsystem) VoIP (for Voice over IP) network architecture or any other network architecture. In the example described here, the communication network 101 is an IMS network with a fixed VoIP telephony service, and is for example representative of the end-to-end network architecture in the case of a call originating from a call center located abroad via a transit network. The communication network 101 therefore corresponds to a group of communication networks of different telecommunications operators and that are interconnected with one another by way of interconnection servers. The servers 101a, 101b and 101c respectively represent the servers of the IMS network of the telecommunications operator of the caller, the transit network and of the called party for routing a communication between the terminal 100a and the terminal 104a, for example.

The IMS core (not shown) of each network consists for example of a P-CSCF (Proxy Call State Control Function) entry point server connected to the terminals (for example 100a) by way of an IPBX (Internet protocol Private Branch Exchange), interconnected in terms of SIP with the S-CSCF (Serving Call State Control Function) server, which is itself interconnected with an HSS (Home Subscriber Server) database via a standardized interface Cx using the Diameter protocol, and in terms of SIP with the TAS (Telephony Application Server) application server via a standardized ISC (IP Multimedia Service Control) interface that is responsible for executing what are called "originating" services, such as OIR (Originating Identification Restriction) services, call barring, etc. The TAS application server is also connected to an MRF (Media Resource Function) media server for in some usage cases playing voice/video announcements to the caller, for example in the case of a dialing error. The S-CSCF server is also interconnected with the DNS ENUM (Electronic NUMbering) server via the DNS (Domain Name Server) protocol in order to route a call to the recipient. If for example the number of the recipient is present in the database ENUM, this means that the recipient and the call center have the same telecommunications operator. If not, this means that the recipient is a client of another telecommunications operator or of another type of network of the same telecommunications operator and in which case the BGCF (Breakout Gateway Control Function) function internal to the S-CSCF will allow the call request to be redirected to an external network, based for example on a routing table based on telephone prefixes or any other information present in the call signaling. The call request then travels via a SIP interface via an IBCF (Interconnection Border Control Function) server, which will transmit the call request to its counterpart on the network of another operator.

The terminals 100a, 100b, 100c, 104a and 104b may be any type of terminal that allow the establishment of telephony, videophony, instant messaging, SMSoIP, etc. communication sessions. The terminals 100a, 100b, 100c, 104a and 104b correspond for example to a mobile telephone, a landline telephone, a smartphone, a tablet, a television connected to a communication network, a connected object, an autonomous car, or a personal computer.

The terminals 100a, 100b, 100c, 104a and 104b may transmit and receive any type of communication via the communication network 101. The terminals 100a, 100b and 100c are for example terminals used by telemarketers and telesalespeople from a call center located abroad. The terminals 104a and 104b are for example the terminals of sales leads solicited by telemarketers or telesalespeople. The environment shown in FIG. 1 also comprises two digital storage spaces, 106 and 107. The element 106 is for example a database for managing the portability of the telephone numbers in the country where the called party is located. The portability of the number makes it possible to change operator while still keeping the same telephone number. The digital storage space 107 makes it possible to store an identifier of the caller in association with at least one item of certification data. It may be located in the network of the telecommunications operator of the caller, the transit network or else of the called party. The identifier of the caller may for example be the content of the SIP FROM header contained in a SIP signaling message. It should be noted that the content of the SIP FROM field is declarative and that it is this content that is rendered on the terminal of the called party. It is therefore not an item of data certified by a third party such as for example a telecommunications operator or a regulatory authority.

According to one particular embodiment, the digital storage space corresponds to a database.

According to one particular embodiment, the identifier of the caller corresponds to his telephone number.

According to one particular embodiment, the identifier of the caller corresponds to his email address.

The certification data stored in the digital storage space and associated with the identifier of the caller may be for example:
- a SIP PAI (Session-Initiation-Protocol P-Asserted-Id, standardized by the IETF RFC3455) item of data with the option of having 2 simultaneous items of content, one in the SIP URI (Session-Initiation-Protocol Uniform-Resource-Identifier) format and the other in the TEL URI (TEL Uniform-Resource-Identifier) format,
- a SIP PANI (Session-Initiation-Protocol Private-Access-Network-Identifier standardized by the IETF RFC3455/RFC7913) item of data,
- a SIP PVNI (Session-Initiation-Protocol P-Visited-Network-Identifier) item of data, a field whose structure is standardized by the IETF (RFC3455),
- a SIP item of data carrying domain names or an IP address, such as the SIP FROM, TO, RURI, VIA, CONTACT headers,
- an item of data in connection with SDP parameters contained in the SIP messages, such as for example the "c" (Connection) parameter, or else
- an IMEI (International Mobile Equipment Identifier) item of data for the equipments/mobile terminals.

If the network 101 is a network using circuit-switched technology (not shown), such as for example the 2G/3G mobile network, the identifier of the caller may correspond to the content of the Generic Number information element, if this is present in the request to establish the communication, or else to the content of the Calling Party Number information element. The certification data may then correspond to the content of the Calling Party Number information element that carries the identifier of the physical telephone line, to the content of the Location Number field present in the call signaling, to the content of the IMSI (International Mobile Subscriber Identity) information element of the physical SIM/eSIM card/component of the terminal/device of the caller or else to the content of the IMEI (International Mobile Equipment Identifier) for the equipments/mobile terminals.

According to one particular embodiment, the environment also includes a terminal 105, such as for example a mobile telephone, a tablet or a personal computer able to communicate with the digital storage space 107 through a communication network, such as for example through the communication network 101. The communication may for example take place by virtue of a secure connection associated with a user account. This allows the service provider telecommunications operator for example to fill in the digital storage space with the identifiers of its clients and one or more associated items of certification data. The client to whom the identifier is allotted may also, depending on the service and/or his telecommunications operator/service provider, fill in one or more items of certification data allowing for example the correct usage of his identifier by a third party, such as a call center. This also allows him, if he has several identifiers, to manage the certification data associated with each identifier and/or terminal that he possesses.

Figure 2:
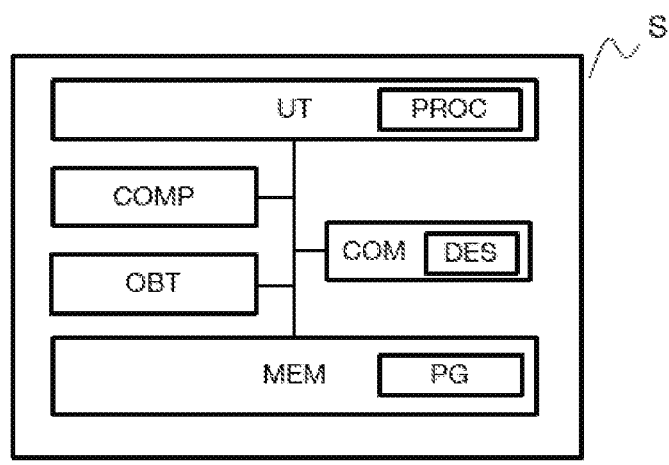
FIG. 2 illustrates the architecture of a device implementing one particular embodiment of the disclosed technology.

FIG. 2 illustrates a device S implementing a particular embodiment of the disclosed technology. The device S has the conventional architecture of a computer, and comprises in particular a memory MEM, a processing unit UT, equipped for example with a processor PROC, and driven by the computer program PG stored in memory MEM. The computer program PG comprises instructions for implementing the steps of the method for determining spoofing of at least one identifier as described below with reference to FIGS. 3 and 4 when the program is executed by the processor PROC.

On initialization, the code instructions of the computer program PG are for example loaded into a memory, before being executed by the processor PROC. The processor PROC of the processing unit UT in particular implements the steps of the method for determining spoofing of at least one identifier according to any one of the particular embodiments described with reference to FIGS. 3 and 4 according to the instructions of the computer program PG.

The device S comprises a communication module COM configured so as to establish communications with an IP network using an Ethernet or Wi-Fi technology, for example. This communication module is used to receive a signaling message of a communication from a first terminal and to transmit a signaling message to one or more terminals on the basis of the result of the comparison step.

The device S also comprises a module OBT designed to obtain an item of certification data linked to an identifier of the caller and received in the signaling message. This item of certification data may for example be obtained from a digital storage space such as a database. The database may be of any type, such as for example MySQL, Oracle, MongoDB, but also in the form of one or more files.

The device S also comprises a module COMP designed to compare an item of certification data received in the signaling message with an item of certification data obtained on the basis of the identifier of the caller from the digital storage space.

The device S also comprises a module DES designed to decide, on the basis of the result of the comparison, on the type of message to be sent and the recipient. If the comparison indicates for example that the identifier received in the signaling message and originating from the caller comprises an item of certification data obtained from the storage space, the item of certification data being associated with the identifier, then the signaling message is transmitted to the called party. If on the other hand the comparison indicates the opposite, then an error message may be sent to the caller. Other types of message or behavior are obviously possible depending on the service. An electronic message (SMS, email, etc.) may for example be sent to the caller, notifying him that the signaling message has not succeeded and that identity spoofing is suspected. Another behavior may consist in transmitting the signaling message to the called party but while anonymizing the identity of the caller or else adding information to the identifier of the caller, such as for example a predetermined prefix or suffix, in order to inform the called party that there is a suspicion that the identity of the caller has been spoofed.

In this example, the module DES is a submodule of the module COM, but other technical architectures are also possible. The module DES may for example be independent from the module COM.

According to one particular embodiment, the device S may comprise a storage module (not shown) in which the identifiers of the callers and the associated certification data are stored.

According to one particular embodiment, the device S is contained in a server, such as for example one of the servers of the networks 101*a*, 101*b* or 101*c* of FIG. 1.

According to one particular embodiment, the device S is contained in an ADSL or fiber domestic Internet gateway or a business gateway, such as a PBX or an IPBX. It should be noted that the gateway may be partially virtualized and hosted for example on a server located in the network.

According to one particular embodiment, the device S is contained in the terminal of the called party.

Figure 3:
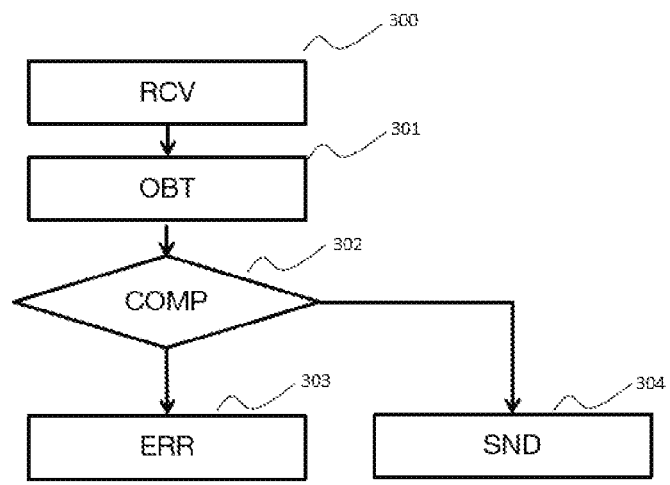
FIG. 3 illustrates steps of the method for determining spoofing of at least one identifier according to one particular embodiment.

FIG. 3 illustrates steps of the method for determining spoofing of at least one identifier according to one particular embodiment. The method runs on the device for determining spoofing of at least one identifier located for example on a server in the network, on an Internet gateway such as an ADSL or fiber router, on an IPBX or on the terminal of the called party. In the first step (RCV), the method will receive a signaling message of a communication from a first terminal. The method will then recover the identifier of the caller and at least one item of certification data from the signaling message, if the signaling message is a message defined as having to be processed by the method. The signaling messages to be processed by the method may be for example SIP INVITE, OPTIONS, INFO or else MESSAGE messages.

According to one particular embodiment, the messages defined as having to be processed by the method are the signaling messages for requesting establishment of the communication.

According to one particular embodiment, the messages defined as having to be processed by the method are the signaling messages of the communication for discovering the technical capabilities of the called terminal. According to one particular embodiment, the messages defined as having to be processed by the method are the signaling messages of the communication for directly sending text or multimedia content, such as photos or videos, to said second terminal.

According to one particular embodiment, the signaling message might not comprise certification data. In this case, the method then moves directly, and depending on the configuration of the service, to step 303 or 304 with sending of an error message to the caller and/or transmission of the signaling message to the called party with the indication that the identifier of the caller may be spoofed. According to one particular embodiment, if, at the end of the first step, the identifier of the caller and an item of certification data present in the signaling message are identical, the method may consider that the signaling message is certified. The method then moves directly to the step SND. In the case for example of SIP telephony communication, if the content of the SIP PAI field that corresponds to the identifier of the physical telephone line (field filled in by the telecommunications operator of the caller) is identical to the content of the SIP FROM field declared in the signaling message, then the method may consider that the call originated from the correct telephone line and that the identifier has not been spoofed. The method may also consider that the signaling message is certified if the SIP FROM field contains the SIP PAI field or vice versa. This makes it possible for example not to take into account a prefix or suffix added to one or the other of the two fields, such as for example a domain name.

In a second step (OBT), the method will obtain one or more items of certification data associated with the identifier of the caller, recovered in the first step (RCV), from a digital storage space, such as for example a database. If the identifier of the caller does not exist or if no item of certification data is available in the digital storage space in connection with the identifier of the caller, an error message may be sent to the caller. The same applies if the digital storage space is temporarily unavailable.

According to one particular embodiment, the triggering of this step may depend on the presence of a prefix or a suffix in the identifier of the caller. In the case of a telephone number, this allows the method for example to process only national numbers without an international prefix. This embodiment is particularly suitable when the use of the digital storage space is limited to within a national scope. In this case, if the number of the caller is an international number, the method then moves directly and depending on the configuration of the service to step 303 or 304.

In the third step (COMP), the method will compare the received and obtained certification data. If the result of the comparison is positive, the signaling message is then transmitted (SND) by the communication module of the device to the called party. If not, an error message may be sent to the caller (ERR). The result of the comparison may be considered to be positive when for example the SIP FROM field or any received certified item of data contains an item of certification data obtained from the digital storage space and associated with the identifier or vice versa. This makes it possible for example not to take into account a prefix or suffix added to a received or obtained item of certification data.

Figure 4:
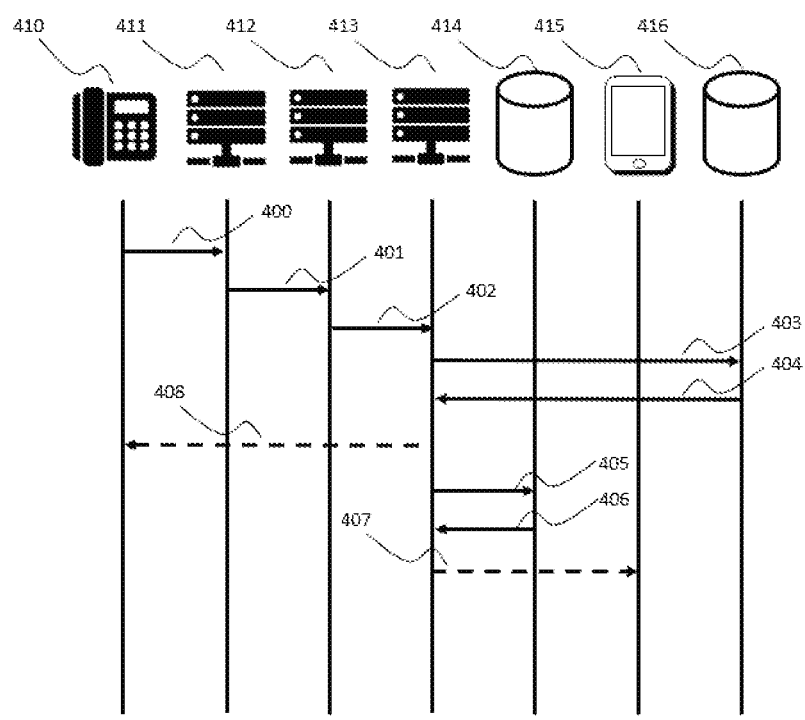
FIG. 4 illustrates steps of the method for determining spoofing of at least one identifier according to a another particular embodiment.

FIG. 4 illustrates steps of the method for determining spoofing of at least one identifier according to a second particular embodiment, and describes the specific case of SIP communication in connection with the environment described in FIG. 1.

Communication is established for example by the terminal 100*a* in FIG. 1, corresponding for example to the terminal 410 in FIG. 4. In order to make a call (400) from a terminal (410) and carry out its telemarketing campaign, the call center uses an IPBX (Internet protocol Private Branch Exchange) equipment that is interconnected with the IMS VoIP network of its operator. The IPBX is registered in terms of SIP in the IMS core network of the operator with at least one IMPU (IP Multimedia PUblic Identity) public identity corresponding to the number/identifier of the physical telephone line assigned to the call center by its operator.

The communication request (400) is sent in the form of a SIP INVITE message in accordance with the SIP protocol. The SIP INVITE message in particular comprises:

- the address of the terminal 410 comprising a public identity, such as for example the telephone number, in a sender address field of the communication request, called "FROM".
- the public identity of the recipient (415) in a recipient address field of the communication request, called "To",
- the public identity of the recipient in a recipient SIP address field, called "R-URI" for Request Uniform Resource Identifier.

The communication request (400) is then taken over by the operator of the call center and transits via its servers (411) and its IMS network. The operator will then enrich the signaling message, such as for example a connection establishment message, with a PAI (Private Asserted Identity) telephone number corresponding to the international number of the physical telephone line of the call center. The operator also adds the PANI (Private Access Network Information) location information, corresponding to the location of the call center, to the message. The PAI and PANI fields are therefore data certified by the operator.

The communication request (401) then comprises:
- the address of the terminal 410 comprising a public identity associated with the terminal 410, such as for example the telephone number, in a sender address field of the communication request, called "FROM".
- the public identity of the recipient (415) in a recipient address field of the communication request, called "To",
- the public identity of the recipient in a recipient address field, called "R-URI" for Request Uniform Resource Identifier.
- the number of the line of the IPBX of the caller in a certified caller identity field, called "PAI".
- the location of the call center with the CC (Country Code) information, corresponding to the identifier of the country of the caller, the OC (Operator Code) information, corresponding to the identifier of the operator of the caller and the location (LAC for Location Area Code), such as the identifier of the town, the postcode, the district or the address, in a location field, called "PANI".

The message is then processed by the servers operated by the transit network (412). The transit network may then consult, depending on the telephone prefix of the recipient and potentially the telephone prefix of the caller, a database (not shown) so as to find the recipient network (413) of the caller. The request (402) is then transmitted to the recipient network (413).

In the example described here, the method for determining spoofing of at least one identifier is implemented for example by a device for determining spoofing of at least one identifier located on the IBCF equipment of the IMS network of the telecommunications operator of the called party (413), but could be hosted on any server taking part in the communication.

The method will then interrogate (403), by providing the identifier contained in the SIP FROM field of the received signaling message as parameter, a digital storage space (416), such as for example a database in which the identifier of the caller and the associated certification data are stored. The device then receives (404) the certification data, such as for example an item of PAI data (PAI1) whose content contains the number/identifier of the physical telephone line associated with the identifier of the caller, an item of PAI data (PAI2) whose content contains for example the physical telephone line number of the IPBX of the call center, or else an item of PANI data whose content contains the certified location of the line used by the call center. This information has been filled in for example in the digital storage space by a telecommunications operator or directly by the clients via for example a secure administration tool, such as a web portal. It should be noted that this information may have a limited validity period. The method will then compare the received data. If:
- the content of the PAI1 field obtained from the digital storage space comprises the content of the SIP PAI or FROM field present in the signaling message, or
- the content of the PAI2 field obtained from the digital storage space comprises the content of the PAI field present in the signaling message, or
- the content of the PANI field obtained from the digital storage space comprises the content of the PANI field present in the signaling message, the SIP message is transmitted to the recipient.

It should be noted that, in order to improve the quality, the device may be configured such that all of the comparison scenarios described above or a subset thereof are necessary for the SIP message to be able to be transmitted to the recipient.

If not, the comparison module considers that a communication request with identifier spoofing is involved and applies a preconfigured processing operation, such as for example sending a signaling message to the caller (408) with a 403 Forbidden error code.

If the SIP FROM field contains "anonymous", for example in the case of a masked call, the method might not perform any processing operation on the signaling message and transmit it to the terminal of the called party. As an alternative, the method may also consider that the caller should be able to be identified before transmitting the signaling message. The method then transmits a signaling message with an error message to the caller, such as for example a 403 Forbidden message.

As an alternative, the method may interrogate the digital storage space (416) by providing the content of the SIP PAI field of the received signaling message as identifier and compare the content of the obtained certified data with those received and present in the fields of the SIP message. If at least one of the obtained items of data comprises one of the received items of data, then the SIP signaling message is transmitted to the recipient.

If the identifier received in the SIP message does not exist in the digital storage space, the method transmits a signaling message with an error code to the caller, such as for example a 404 Not Found SIP message.

The IBCF server of the network of the telecommunications operator of the called party then consults (405) the number portability database (414), which database is shared by all of the telecommunications operators operating in a country, by providing the number of the called party contained in the SIP TO or RURI field of the signaling message. In return (406), the portability database provides either the same number if this has not ported to another telecommunications operator, in which case the operator of the called party is determined via the prefix of the number, or the same number plus an additional prefix that determines the address of the network equipment of the telecommunications operator of the called party. The signaling message is then transmitted (407) to the called terminal (415).

It should be noted that the portability database could be consulted before the database of the digital space is consulted. It goes without saying that the embodiment that has been described above has been given purely by way of wholly non-limiting indication, and that numerous modifications may easily be made by those skilled in the art without, however, departing from the scope of the disclosed technology.

What is claimed is:

1. A method for determining spoofing of at least one non-certified identifier, the non-certified identifier intended for the use of a communication device, during communication between a first communication terminal and at least one second communication terminal, the method implemented by a device for determining spoofing of at least one non-certified identifier, the method comprising:
   receiving a signaling message of the communication from the first communication terminal and intended for the at least one second communication terminal, the signaling message comprising the at least one non-certified identifier and at least one first item of certification data,
   obtaining at least one second item of certification data on the basis of the at least one received non-certified identifier, comparing the at least one first item of certification data with the at least one second item of certification data, and transmitting at least the message to the at least one second communication terminal on the basis of the result of the comparison.

2. The method of claim 1, wherein transmitting at least the message to the at least one second communication terminal further comprises transmitting an error message to the first communication terminal.

3. The method of claim 1, wherein the non-certified identifier corresponds to a telephone number of the first communication terminal.

4. The method of claim 1, wherein the non-certified identifier corresponds to an email address used by the first communication terminal.

5. The method of claim 1, wherein the second item of certification data is obtained from a database.

6. The method of claim 5, wherein the second item of certification data is transmitted to the database via a dedicated interface.

7. The method of claim 1, wherein the reception of a signaling message requesting establishment of the communication triggers the obtaining of the at least one second item of certification data.

8. The method of claim 1, wherein the reception of each signaling message of the communication triggers the obtaining of the at least one second item of certification data.

9. The method of claim 8, wherein the reception of each signaling message of the communication for sending multimedia content to the second communication terminal triggers the obtaining of the at least one second item of certification data.

10. The method of claim 1, wherein the result of the comparison of the non-certified identifier with the at least one first item of certification data triggers the obtaining of the at least one second item of certification data.

11. A device for determining spoofing of at least one non-certified identifier, the non-certified identifier intended for the use of a communication device, during communication on the communication device between a first communication terminal and at least one second communication terminal, the device comprising a processor and a memory, the device configured to:

receive and/or transmit a signaling message of the communication from the first communication terminal and intended for the at least one second communication terminal, the signaling message comprising the at least one non-certified identifier and at least one first item of certification data, obtain at least one second item of certification data associated with the non-certified identifier, compare the at least one first item of certification data with the at least one second item of certification data, such that the establishment of a positive result by the comparison triggers the transmission of the signaling message by the communication device.

12. A server comprising the device of claim 11.

13. A gateway comprising the device of claim 11.

14. A communication terminal comprising the device of claim 11.

15. A system for determining spoofing of at least one non-certified identifier, the non-certified identifier intended for the use of a communication device, during communication on the communication device between a first communication terminal and at least one second communication terminal, the system configured to:

receive and/or transmit a signaling message of the communication from the first communication terminal and intended for the at least one second communication terminal, the signaling message comprising the at least one non-certified identifier and at least one first item of certification data, obtain at least one second item of certification data associated with the non-certified identifier, and compare the at least one first item of certification data with the at least one second item of certification data, the system comprising a storage device configured to store the at least one non-certified identifier and the at least one second item of certification data associated with the at least one non-certified identifier, the system configured such that the establishment of a positive result by comparison triggers the transmission of the signaling message by the system.

16. The system of claim 15, wherein the system is configured to fill in at least one second item of certification data in the storage device via a human-machine interface.

17. A non-transitory computer readable storage medium having stored thereon instructions which, when executed by a processor, cause the processor to implement the method of claim 1.

* * * * *